United States Patent
Chang

(10) Patent No.: US 10,628,358 B2
(45) Date of Patent: Apr. 21, 2020

(54) SCHEDULING METHOD, PCIE SWITCH AND ELECTRONIC SYSTEM USING THE SAME

(71) Applicant: Wistron Corporation, New Taipei (TW)

(72) Inventor: Shih-Hui Chang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 119 days.

(21) Appl. No.: 15/853,936

(22) Filed: Dec. 25, 2017

(65) Prior Publication Data

US 2019/0004986 A1    Jan. 3, 2019

(30) Foreign Application Priority Data

Jun. 28, 2017    (TW) .............................. 106121522 A

(51) Int. Cl.
| | |
|---|---|
| *G06F 13/36* | (2006.01) |
| *G06F 13/364* | (2006.01) |
| *G06F 13/366* | (2006.01) |
| *G06F 13/42* | (2006.01) |
| *G06F 13/24* | (2006.01) |
| *G06F 13/40* | (2006.01) |

(52) U.S. Cl.
CPC ............ *G06F 13/364* (2013.01); *G06F 13/24* (2013.01); *G06F 13/366* (2013.01); *G06F 13/4022* (2013.01); *G06F 13/4278* (2013.01); *G06F 13/4282* (2013.01); *G06F 2213/0026* (2013.01)

(58) Field of Classification Search
CPC ...... G06F 13/364; G06F 13/366; G06F 13/40; G06F 13/42; G06F 13/24; G06F 13/4282; G06F 13/4022; G06F 13/4278; G06F 2213/0026
See application file for complete search history.

(56) References Cited

U.S. PATENT DOCUMENTS

| | | | |
|---|---|---|---|
| 7,398,343 B1* | 7/2008 | Marmash | G06F 13/24 710/240 |
| 9,146,776 B1* | 9/2015 | Geddes | G06F 13/24 |
| 9,298,648 B2 | 3/2016 | Johnson | |
| 2011/0197004 A1 | 8/2011 | Serebrin | |

(Continued)

FOREIGN PATENT DOCUMENTS

| | | |
|---|---|---|
| CN | 102681952 A | 9/2012 |
| CN | 102792272 A | 11/2012 |

(Continued)

*Primary Examiner* — Henry Tsai
*Assistant Examiner* — Christopher Daley
(74) *Attorney, Agent, or Firm* — Winston Hsu

(57) ABSTRACT

The present invention provides a scheduling method for a peripheral component interconnect express (PCIe) switch of an electronic system. The PCIe switch is utilized for handling input/output requests of a host of the electronic system. The scheduling method includes the PCIe switch determining a scheduling sequence of message signal interrupts (MSIs) and read/write requests corresponding to the input/output requests according to amount of the message signal interrupts corresponding to the input/output requests; and the PCIe switch handling the message signal interrupts and the read/write requests according to the scheduling sequence.

20 Claims, 3 Drawing Sheets

(56) References Cited

U.S. PATENT DOCUMENTS

| 2014/0337540 | A1* | 11/2014 | Johnson | G06F 13/14 |
|---|---|---|---|---|
| | | | | 710/5 |
| 2015/0301967 | A1* | 10/2015 | Arroyo | G06F 13/32 |
| | | | | 710/313 |
| 2015/0356036 | A1* | 12/2015 | Feehrer | G06F 13/24 |
| | | | | 710/263 |

FOREIGN PATENT DOCUMENTS

| EP | 2849077 B1 | 10/2017 |
|---|---|---|
| TW | 201229911 A1 | 7/2012 |

* cited by examiner

SCHEDULING METHOD, PCIE SWITCH AND ELECTRONIC SYSTEM USING THE SAME

BACKGROUND OF THE INVENTION

1. Field of the Invention

The present invention relates to a scheduling method, peripheral component interconnect express (PCIe) switch and electronic system using the same, and more particularly, to a scheduling method, PCIe switch and electronic system capable of improving efficiency of the electronic system by scheduling pending works of the PCIe switch.

2. Description of the Prior Art

With the advancement of technology, all kinds of computer devices are provided, since the computer devices usually support different kinds of transmission interfaces and different transmission devices, common transmission devices, such as Bluetooth devices with universal serial bus (USB) interface, networks connected with peripheral component interconnect (PCI) or peripheral component interconnect express (PCIe) interfaces and so on. In general, a computer system utilizes a PCIe switch to send input/output requests to Bluetooth devices with USB interface and solid state disk (SSD) with non-volatile memory express (NVMe), so as to instruct the PCIe switch to perform data accesses of memory. After the PCIe switch finishes the instruction of input/output requests of the computer system, the PCIe switch transmits the message signal interrupt (MSI/MSI-X) to the computer system, so as to finish the input/output requests. However, when the PCIe switch of the computer system simultaneously sends a large amount of input/output requests to multiple electronic devices of the PCIe switch, the PCIe switch delays handling of the finished input/output requests corresponding to the MSIs because of the large amount of the pending works of the data accesses of memory, and may not immediately inform the computer system, which causes a reduction of input/output operations per second (IOPS) and affects the efficiency.

Therefore, how to solve the above mentioned problems to improve the IOPS efficiency of the computer system has become an important work in the scope.

SUMMARY OF THE INVENTION

Therefore, the present invention provides a scheduling method, PCIe switch and electronic system using the same to improve the IOPS efficiency of the electronic system by scheduling the PCIe switch.

An embodiment of the present invention discloses a scheduling method for a peripheral component interconnect express (PCIe) switch of an electronic system. The PCIe switch is utilized for handling input/output requests of a host of the electronic system. The scheduling method comprises the PCIe switch determining a scheduling sequence of message signal interrupts (MSIs) and read/write requests corresponding to the input/output requests according to an amount of the MSIs corresponding to the input/output requests; and the PCIe switch handling the MSIs and the read/write requests according to the scheduling sequence.

An embodiment of the present invention discloses an electronic system, comprising a plurality of electronic devices; a host, for sending input/output requests to the plurality of electronic devices; and a peripheral component interconnect express (PCIe) switch, coupled to the plurality of electronic devices and the host, for determining a scheduling sequence of message signal interrupts (MSIs) and read/write requests corresponding to the input/output requests according to an amount of the MSIs corresponding to the input/output requests, and handling the MSIs and the read/write requests accordingly.

An embodiment of the present invention discloses a peripheral component interconnect express (PCIe) switch, for handling input/output requests of a host of an electronic system, comprising a scheduling unit, for determining a scheduling sequence of message signal interrupts (MSIs) and read/write requests corresponding to the input/output requests according to an amount of the MSIs corresponding to the input/output requests; and a processing unit, for handling the MSIs and the read/write requests according to the scheduling sequence.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
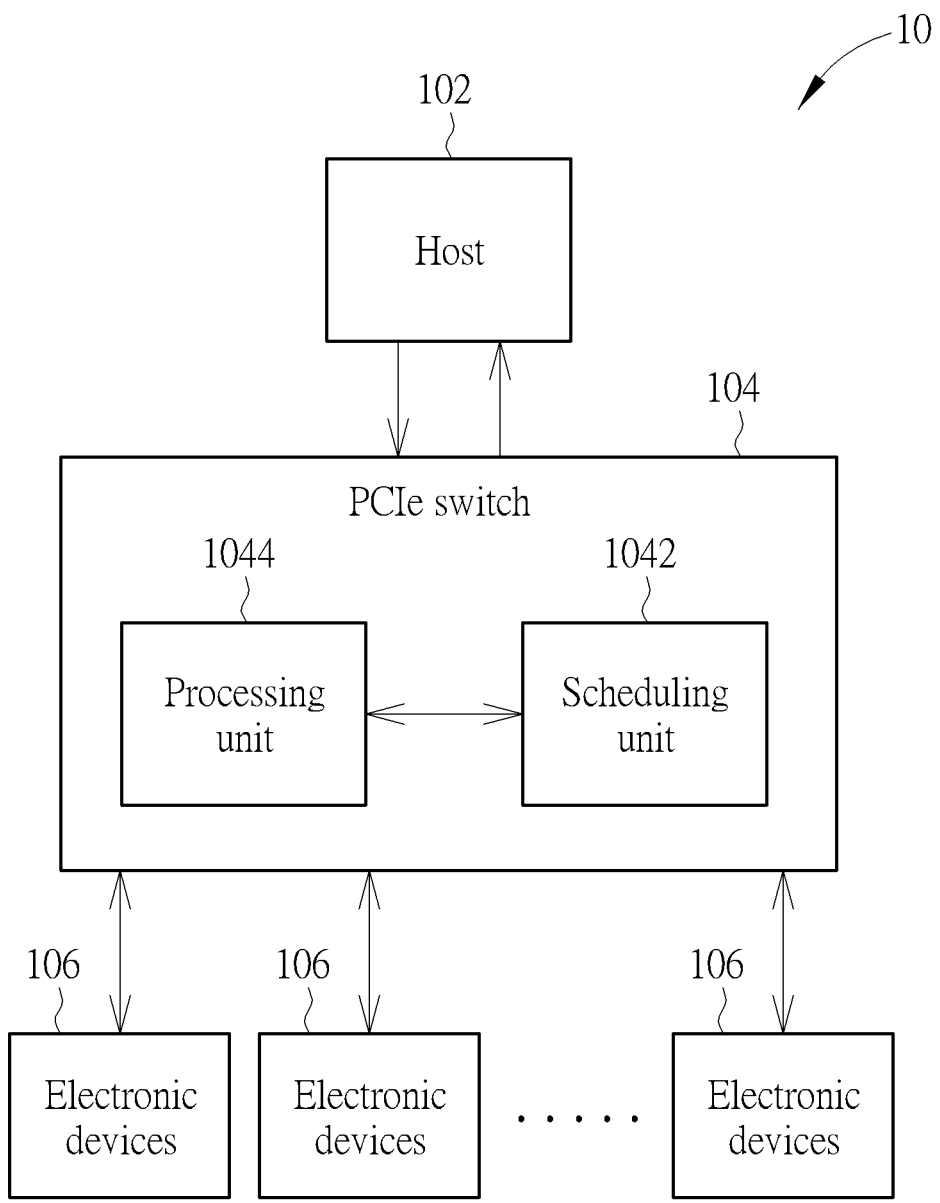
FIG. 1 is a schematic diagram of an electronic system according to an embodiment of the present invention.

Please refer to FIG. 1, which is a schematic diagram of an electronic system 10 according to an embodiment of the present invention. The electronic system. 10 includes a host 102, a peripheral component interconnect express (PCIe) switch 104 and a plurality of electronic devices 106. The host 102 is utilized for sending input/output requests to the electronic devices 106; for example, the host 102 may send read/write requests corresponding to the input/output requests to any of the electronic devices 106. The PCIe switch 104 is coupled to the electronic devices 106 and the host 102, for determining a scheduling sequence of message signal interrupts (MSIs) and read/write requests according to an amount of the MSIs corresponding to the input/output requests, and handling the scheduled MSIs and the scheduled read/write requests accordingly. The PCIe switch 104 includes a scheduling unit 1042 and a processing unit 1044, for scheduling and handling the MSIs and the read/write requests. In addition, the scheduling sequence schedules the MSIs and the read/write requests in an order of first-in-first-out scheme, so as to avoid data missing or timing disorder. Therefore, the PCIe switch 104 re-schedules the MSIs and the read/write requests to effectively handle the MSIs and the read/write requests, such that the PCIe switch 104 improves input/output operations per second (IOPS) efficiency of the electronic system.

In detail, the host 102 may be an application program or a server of the electronic system 10, e.g. a social software application program, a media browsing application program or a server utilized for accessing videos. The electronic devices 106 may be non-volatile memory express (NVMe) solid state disk (SSD), advanced host controller interface (AHCI) SSD, general-purpose computing on graphics processing units (GPGPU) or internet apparatus and so on, and not limited thereto. The scheduling unit 1042 is utilized to determine the scheduling sequence of the MSIs and the read/write requests, for example, the scheduling unit 104 may be implemented by an integrated circuit (IC) or implemented by software or firmware, and not limited herein. The scheduling unit 1042 may further include a processing means such as a microprocessor or Application Specific Integrated Circuit (ASIC), a storage unit and a communication interfacing. The storage unit may be any data storage device that can store program codes, accessed and executed by the processing means. The processing unit 1044 handles the MSIs and the read/write requests according to the scheduling sequence, transmits the MSIs to the host 102, and transmits the read/write requests to the electronic devices 106, for example, the processing unit 104 may be an inter-integrated circuit (I2C) bus interface, a transceiver interface, an input/output interface or other relative communication interfaces. In addition, the electronic system 10 further includes a storing unit (not illustrated in the figures), for buffering the MSIs and the read/write requests. Therefore, when an application (i.e. the host 102), for example, Facebook®, sends the read/write requests corresponding to the input/output requests to the electronic devices 106 via the PCIe switch 104, and after the PCIe switch 104 receives the read/write requests corresponding to the input/output requests from the electronic devices 106, the scheduling unit 1042 of the PCIe switch 104 may determine the scheduling sequence of the MSIs and the read/write requests according to the amount of the MSIs, and the processing unit 1044 of the PCIe switch 104 handles the read/write requests and the MSIs according to the scheduling sequence in the order of first-in-first-out scheme, so as to avoid delay of handling the MSIs or the read/write requests. Notably, the electronic system 10 may not only be implemented by software in the computer system, but also be implemented by application-specific integrated circuit (ASIC) or field-programmable gate array (FPGA) and so on, and not limited thereto.

In brief, the electronic system 10 of the present invention determines the scheduling sequence of the PCIe switch 104 handling the MSIs and the read/write requests according to the amount of the MSIs. That is, the PCIe switch 104 determines an order of handling the MSIs and the read/write requests by the amount of the MSIs, so as to prevent that the host 102 cannot be immediately notified with the finished read/write requests because of the delay of handling the MSIs.

Figure 2:
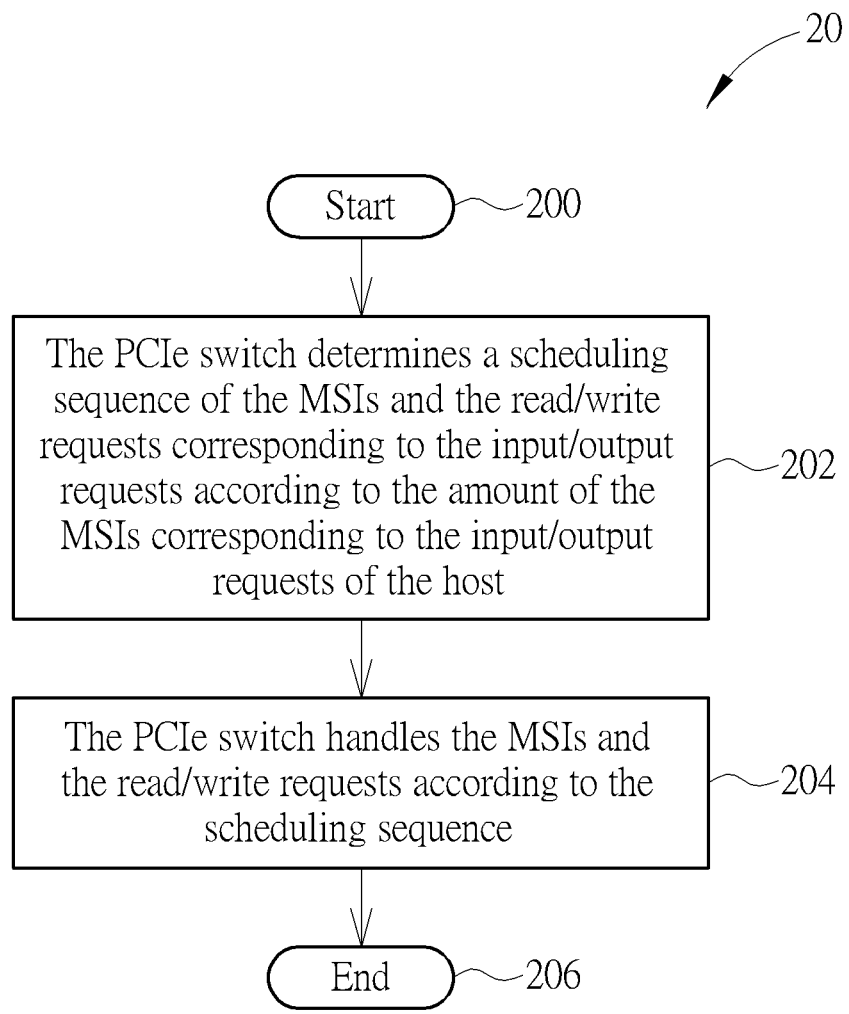
FIG. 2 is a schematic diagram of a process according to an embodiment of the present invention.

As to explanation of the operation of the electronic system 10, please refer to FIG. 2, which is a schematic diagram of a process 20 according to an embodiment of the present invention. The process 20 includes the following steps:

Step 200: Start.

Step 202: The PCIe switch 104 determines a scheduling sequence of the MSIs and the read/write requests corresponding to the input/output requests according to the amount of the MSIs corresponding to the input/output requests of the host 102.

Step 204: The PCIe switch 104 handles the MSIs and the read/write requests according to the scheduling sequence.

Step 206: End.

According to the process 20, the present invention may determine the scheduling sequence of the MSIs and the read/write requests based on the amount of the MSIs corresponding to the input/output requests from the host 102. When the host 102 sends the input/output requests, and the PCIe switch 104 finishes handling the read/write requests corresponding to the input/output requests, the electronic devices 106 executes the read/write requests, and transmits the MSIs to the PCIe switch 104, and the PCIe switch 104 simultaneously exits the pending works of the MSIs and the read/write requests. Therefore, in Step 202, the PCIe switch 104 determines the scheduling sequence of the MSIs and the read/write requests according to the amount of the MSIs. For example, when the PCIe switch 104 detects one MSI, the scheduling unit 1042 schedules the MSI as a first scheduling sequence, the processing unit 1044 handles the MSIs directly, and then handles the read/write requests. In another example, when the PCIe switch 104 detects 5 read/write requests and 2 MSIs, in order to prevent delay of handling the MSIs, the scheduling unit 1042 may once schedule each of the MSIs and then schedule 2 read/write requests.

Then, in Step 204, the processing unit 1044 of the PCIe switch 104 sequentially handles the MSIs and the read/write requests according to the scheduling sequence (e.g. handles 1 MSI, and then handles 2 read/write requests). Therefore, scheduling the MSIs and the read/write requests may effectively avoid delay of handling the MSIs, and simultaneously finish the input/output requests of the host 102 to improve the IOPS efficiency of the electronic system 10.

The embodiments stated in the above are utilized for illustrating that the present invention schedules the MSIs and the read/write requests of the PCIe switch 104 to avoid delay of handling the MSIs. Notably, those skilled in the art may make modifications and alterations to the electronic system according to different system requirements, for example, adjusting the amount of the MSIs or the amount of the read/write requests or sequence when handling the MSIs and the read/write requests according to different users' requirements or major application environment, or under circumstances of different amounts of the MSIs or the read/write requests, deciding the scheduling sequence of the MSIs or the read/write requests. In other words, the scheduling sequence of the MSIs or the read/write requests may be determined based on an amount of data transmission, an amount of the input/output requests or an application environment of the host 102, but not limited thereto. For example, assume the application program is Facebook®, since Facebook® is mostly used for showing figures and texts, the amount of the input/output requests is large but the amount of the data transmission is small, and the PCIe switch 104 may preferentially handle the MSIs when detecting the MSIs, so as to avoid delay of handling the MSIs and avoid affecting the IOPS efficiency. In another example, assuming the application program is Youtube® video application program, since Youtube® is mostly used for playing videos, the amount of the input/output requests is small but the amount of the data transmission is large, and under this circumstance, the PCIe switch 104 may preferentially handle the read/write requests of the input/output, so as to avoid video intermittence. The above embodiments may make modifications or alternatives according to users or manufacturers' indication or settings of electronic systems, and not limited thereto.

In an embodiment, the user may determine scheduling method of the MSIs and the read/write requests according to the application environment of the electronic system 10. That is, the users or the manufacturers may set the scheduling sequence under circumstances with different application environments. For example, please refer to Table 1:

TABLE 1

|  | Amount X of the MSIs | Amount Y of the read/write requests |
|---|---|---|
| Application environment 1 | 1 | 7 |
| Application environment 2 | 2 | 6 |
| Application environment 3 | 3 | 5 |
| Application environment 4 | 4 | 4 |
| Application environment 5 | 5 | 3 |
| Application environment 6 | 6 | 2 |
| Application environment 7 | 7 | 1 |

As shown in Table 1, under the circumstance of the application environment 1 (small amount of input/output requests, large amount of data transmission), for example, Youtube® or relative video application programs, the PCIe switch 104 schedules the MSIs based on the Table 1; in other words, after the scheduling unit 1042 of the PCIe switch 104 schedules each of the MSIs, the scheduling unit 1042 then schedules 7 read/write requests, and the processing unit 1044 handles the MSIs and the read/write requests according to the scheduling sequence. Alternatively, under the circumstance of the application environment 7 (large amount of input/output requests, small amount of data transmission), for example, Facebook® or relative figures, texts application programs, the PCIe switch 104 may schedule the MSIs based on the Table 1; in other words, after the scheduling unit 1042 of the PCIe switch 104 schedules 7 MSIs, the scheduling unit 1042 then schedules 1 read/write request, and the processing unit 1044 handles the MSIs and the read/write requests according to the scheduling sequence. Further, under the circumstance of the application environment 4, i.e. loading of the amount of the input/output requests is similar to loading of the amount of the data transmission to the electronic system 10, after the scheduling unit 1042 of the PCIe switch 104 schedules 4 MSIs, the scheduling unit 1042 then schedules 4 read/write requests, so as to avoid delay of handling the read/write requests when handling the MSIs, or avoid delay of handling the MSIs when handling the read/write requests. Therefore, the electronic system 10 can effectively improve the IOPS efficiency by scheduling the MSIs and the read/write requests. Note that, the Table 1 illustrates that under different application environments, the amount X of the MSIs and the amount Y of the read/write requests can be stored or recorded in the storing unit of the PCIe switch 104, the amount of the MSIs and the read/write requests may be a ratio, or any other ways to represent the scheduling sequence of the MSIs and the read/write requests, and not limited thereto, all belonging to the scope of the present invention. Moreover, the Table 1 is categorized with application environments 1-7 to illustrate different combinations of the amounts X and Y as examples. In fact, an amount of application environments may be modified depending on system requirements, and the amounts X and Y may be determined according to the amount of data transmission, the amount of the input/output requests or the application environment of the host 102, and not limited thereto.

Figure 3:
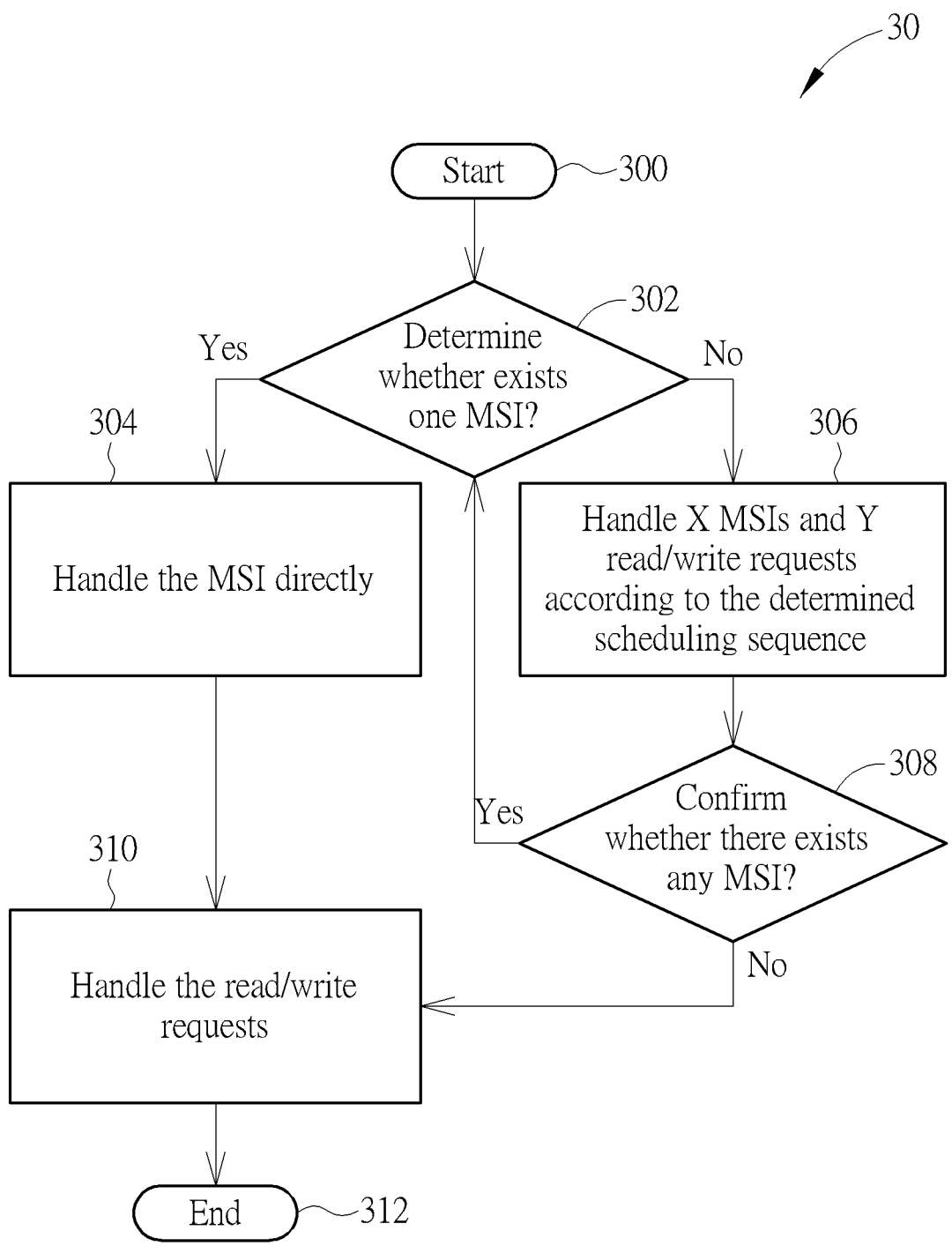
FIG. 3 is a schematic diagram of a handling process according to an embodiment of the present invention.

In another embodiment, as to the method of the PCIe switch 104 scheduling the MSIs, the scheduling unit 1042 may determine the scheduling sequence as each time scheduling X MSIs, and then scheduling Y read/write requests according to the process 20, or each time scheduling Y read/write requests, and then scheduling X MSIs, where the sequence of the MSIs and the read/write requests is not limited thereto, and may be modified based on the requirements. Then, the processing unit 1044 handles X MSIs and Y read/write requests according to the scheduling sequence, and the operation method may be concluded to a handling process 30, which is shown in FIG. 3. The handling process 30 includes the following steps:

Step 300: Start.
Step 302: Determine whether exists one MSI. If yes, execute Step 304; if not, execute Step 306.
Step 304: Handle the MSI directly.
Step 306: Handle X MSIs and Y read/write requests according to the determined scheduling sequence.
Step 308: Confirm whether there exists any MSI. If yes, execute Step 302; if no, execute Step 310.
Step 310: Handle the read/write requests.
Step 312: End.

According to the handling process 30, the processing unit 1044 determines the scheduling sequence of the MSIs and the read/write requests based on Table 1. First, in Step 302, the processing unit 1044 determines whether the PCIe switch 104 includes one MSI, so as to determine whether to preferentially handle the MSI; if yes, Step 304 is executed, i.e. the processing unit 1044 directly handles the MSI; in contrast, Step 306 is executed, i.e., the processing unit 1044 handles every X MSIs and Y read/write requests accordingly. Notably, in Step 302, the processing unit 1044 determines whether the PCIe switch 104 includes one MSI, so as to determine whether to preferentially handle the MSI is an embodiment. In fact, according to the system requirements, the processing unit 1044 may also determine whether the PCIe switch 104 includes multiple MSIs, or whether the amount of MSIs is smaller than X, so as to determine conditions of whether to preferentially handle the MSIs. Furthermore, when the amount of the MSIs is smaller than X, the PCIe switch 104 may schedule all of the MSIs, and when the amount of the read/write requests is smaller than Y, the PCIe switch 104 may schedule all of the read/write requests. Then, in Step 308, the processing unit 1044 confirms whether the PCIe switch 104 includes any pending MSI; if yes, Step 302 is executed to confirm whether only one MSI exists; in contrast, representing that no pending MSIs exists, Step 310 is executed to handle remaining read/write requests. Therefore, based on the process 20 to determine the scheduling sequence of the MSIs and the read/write requests, and the handling process 30 to handle the MSIs and the read/write requests according to the scheduling sequence, the present invention avoids the circumstances of late handling the MSIs because of handling the read/write requests, and improves the IOPS efficiency of the electronic system 10.

In another embodiment, assuming that the PCIe switch 104 has pending works of 12 read/write requests and 6 MSIs, for example, original unscheduled pending works are: memory write #1, memory write #2, memory read #1, memory write #3, memory read #2, memory write #4, memory write #5, memory read #3, memory write #6, memory write #7, memory write #8, memory write #9, MSI #1, MSI #2, MSI #3, MSI #4, MSI #5, MSI #6, wherein the symbol # represents a number of the memory write, memory read and MSI. Meanwhile, since many read/write requests corresponding to the input/output requests are finished, PCIe switch 104 receives many MSIs from the electronic devices 106, but delays scheduling and handling of the MSIs since there are other pending read/write requests to be handled, and affects the IOPS of the electronic system 10. In this situation, if the PCIe switch 104 is in the application environment 2 shown in Table 1, i.e. in the application environment of the video application program, each time the PCIe switch 104 schedules 2 MSIs, the PCIe switch 104 then schedules 6 read/write requests, by scheduling of the scheduling unit 1042 of the PCIe switch 104, the sequence of the pending works of the PCIe switch 104 is: MSI #1, MSI #2, memory write #1, memory write #2, memory read #1, memory write #3, memory read #2, memory write #4, MSI #3, MSI #4, memory write #5, memory read #3, memory write #6, memory write #7, memory write #8, memory write #9, MSI #5, MSI #6. In this way, the MSI would not be late handled, and the read/write requests can be handled immediately to improve the efficiency of the electronic system 10.

In another embodiment, assuming that the PCIe switch 104 has pending works of 4 read/write requests and 12 MSIs, for example, original unscheduled pending works are: memory write #1, MSI #1, MSI #2, memory write #2, MSI #3, MSI #4, memory write #3, MSI #5, MSI #6, memory read #1, MSI #7, MSI #8, MSI #9, MSI #10, MSI #11, MSI #12, wherein the symbol # represents a number of the memory write, memory read and MSI. In this situation, if the PCIe switch 104 is in the application environment 6 shown in Table 1, i.e. in the application environment of figures and texts application program, each time the PCIe switch 104 schedules 6 MSIs, the PCIe switch 104 then schedules 2 read/write requests, by scheduling of the scheduling unit 1042 of the PCIe switch 104, the sequence of the pending works of the PCIe switch 104 is: MSI #1, MSI #2, MSI #3, MSI #4, MSI #5, MSI #6, memory write #1, memory write #2, MSI #7, MSI #8, MSI #9, MSI #10, MSI #11, MSI #12, memory write #3, memory read #1. In this way, the electronic system 10 can immediately handle the MSIs and the read/write requests to improve the efficiency of the electronic system 10.

Notably, the embodiments stated in the above are utilized for illustrating the concept of the present invention. Those skilled in the art may make modifications and alterations accordingly, and not limited herein. For example, determining the scheduling sequence of the MSIs and the read/write requests may be modified according to the application programs, users and manufacturers requirements. Or, under environments of different application programs, the amount of the MSIs and the read/write requests when scheduling and handling may be determined or adjusted, and not limited herein, which belong to the scope of the present invention.

In summary, the present invention provides the scheduling method, PCIe switch and computer system using the same to avoid delay of handling the MSIs by scheduling the read/write requests and the MSIs of the PCIe switch, so as to improve the IOPS efficiency of the computer system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A scheduling method for a peripheral component interconnect express (PCIe) switch of an electronic system, the PCIe switch is utilized for handling input/output requests of a host of the electronic system, the scheduling method comprising:

the PCIe switch determining a scheduling sequence of message signal interrupts (MSIs) and read/write requests corresponding to the input/output requests according to an amount of the MSIs corresponding to the input/output requests; and the PCIe switch handling the MSIs and the read/write requests according to the scheduling sequences;

wherein the MSI is scheduled prior to the read/write request in the scheduling sequence.

2. The scheduling method of claim 1, wherein the scheduling sequence is determined based on an amount of data transmission, an amount of the input/output requests or an application environment of the host.

3. The scheduling method of claim 1, wherein once the PCIe switch schedules each of a first number of the MSIs, the PCIe switch schedules a second number of the read/write requests.

4. The scheduling method of claim 3, wherein the first number and the second number are determined based on an amount of data transmission, an amount of the input/output requests or an application environment of the host.

5. The scheduling method of claim 3, wherein when the amount of the MSIs is smaller than the first number, the PCIe switch schedules all of the MSIs, and when the amount of the read/write requests is smaller than the second number, the PCIe switch schedules all of the read/write requests.

6. The scheduling method of claim 1, wherein the scheduling sequence of the MSIs and the read/write requests is determined by referring to a lookup table.

7. The scheduling method of claim 1, wherein the scheduling sequence of the MSIs and the read/write requests is in an order of first-in-first-out scheme.

8. An electronic system, comprising:

a plurality of electronic devices;

a host, for sending input/output requests to the plurality of electronic devices; and a peripheral component interconnect express (PCIe) switch, coupled to the plurality of electronic devices and the host, for determining a scheduling sequence of message signal interrupts (MSIs) and read/write requests corresponding to the input/output requests according to an amount of the MSIs corresponding to the input/output requests, and handling the MSIs and the read/write requests according to the scheduling sequence;

wherein the MSI is scheduled prior to the read/write request in the scheduling sequence.

9. The electronic system of claim 8, wherein the scheduling sequence is determined based on an amount of data transmission, an amount of the input/output requests or an application environment of the host.

10. The electronic system of claim 8, wherein once the PCIe switch schedules each of a first number of the MSIs, the PCIe switch schedules a second number of the read/write requests, and the first number and the second number are determined based on an amount of data transmission, an amount of the input/output requests or an application environment of the host.

11. The electronic system of claim 10, wherein when the amount of the MSIs is smaller than the first number, the PCIe switch schedules all of the MSIs, and when the amount of the read/write requests is smaller than the second number, the PCIe switch schedules all of the read/write requests.

12. The electronic system of claim 8, wherein the scheduling sequence of the MSIs and the read/write requests is determined by referring to a lookup table.

13. The electronic system of claim 8, wherein the scheduling sequence of the MSIs and the read/write requests is in an order of first-in-first-out scheme.

14. A peripheral component interconnect express (PCIe) switch, for handling input/output requests of a host of an electronic system, comprising:
- a scheduling unit, for determining a scheduling sequence of message signal interrupts (MSIs) and read/write requests corresponding to the input/output requests according to an amount of the MSIs corresponding to the input/output requests; and
- a processing unit, for handling the MSIs and the read/write requests according to the scheduling sequence;
- wherein the MSI is scheduled prior to the read/write request in the scheduling sequence.

15. The PCIe switch of claim 14, wherein the scheduling sequence is determined based on an amount of data transmission, an amount of the input/output requests or an application environment of the host.

16. The PCIe switch of claim 14, wherein once the scheduling unit schedules each of a first number of the MSIs, the PCIe switch schedules a second number of the read/write requests.

17. The PCIe switch of claim 16, wherein the first number and the second number are determined based on an amount of data transmission, an amount of the input/output requests or an application environment of the host.

18. The PCIe switch of claim 16, wherein when the amount of the MSIs is smaller than the first number, the scheduling unit schedules all of the MSIs, and when the amount of the read/write requests is smaller than the second number, the scheduling unit schedules all of the read/write requests.

19. The PCIe switch of claim 14, wherein the scheduling sequence of the MSIs and the read/write requests is determined by referring to a lookup table.

20. The PCIe switch of claim 14, wherein the scheduling sequence of the MSIs and the read/write requests is in an order of first-in-first-out scheme.

\* \* \* \* \*